Figure 1:
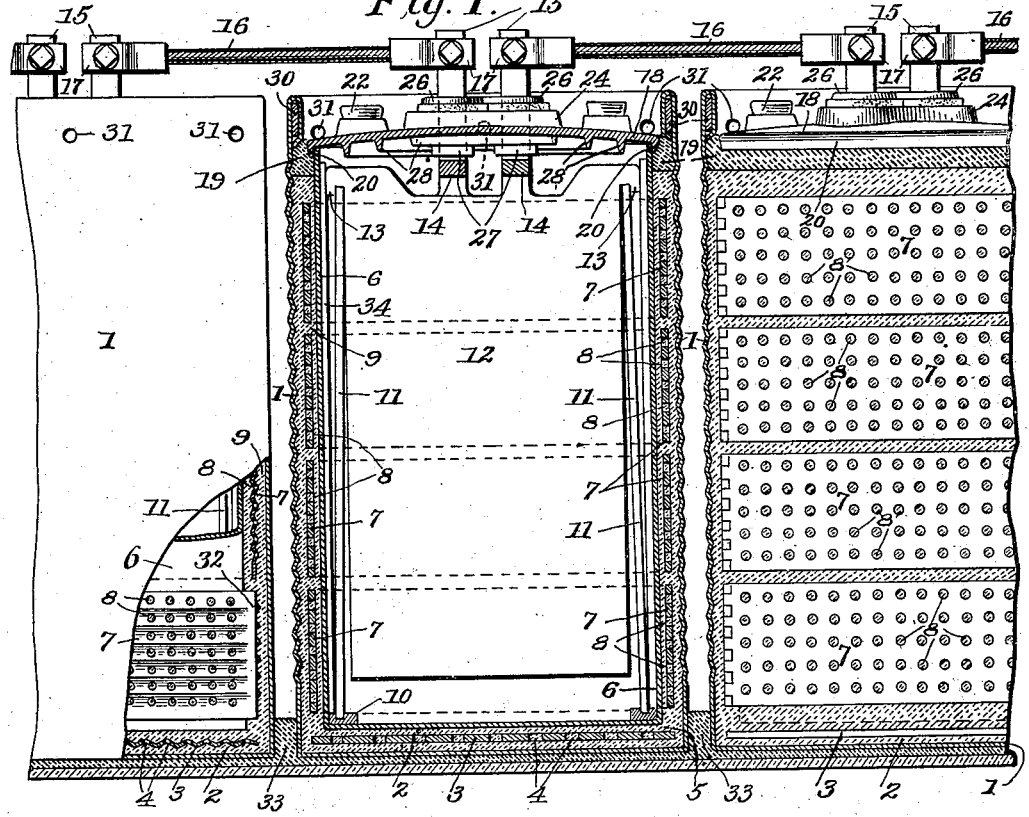

No. 844,815. PATENTED FEB. 19, 1907.
S. LAKE.
STORAGE BATTERY.
APPLICATION FILED MAY 26, 1904.

2 SHEETS—SHEET 1.

Witnesses
J. F. Jaquith
H. A. Kornemann

Inventor
Simon Lake,
by Henry J. Miller
Attorney

THE NORRIS PETERS CO., WASHINGTON, D. C.

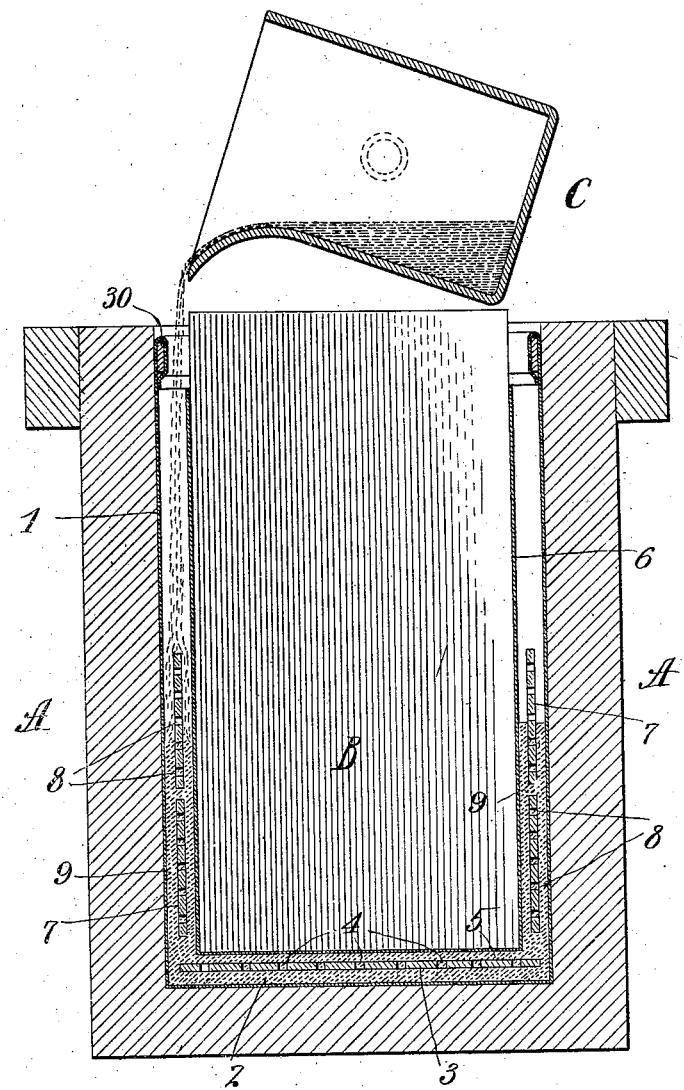

UNITED STATES PATENT OFFICE.

SIMON LAKE, OF BRIDGEPORT, CONNECTICUT.

STORAGE BATTERY.

No. 844,815.        Specification of Letters Patent.        Patented Feb. 19, 1907.

Application filed May 26, 1904. Serial No. 209,864.

*To all whom it may concern:*

Be it known that I, SIMON LAKE, a citizen of the United States, residing at Bridgeport, in the county of Fairfield and State of Connecticut, have invented certain new and useful Improvements in Storage Batteries, of which the following is a specification, reference being had therein to the accompanying drawings.

This invention relates to an improvement in systems of storage batteries designed for power plants, and thus necessarily of comparatively large capacity, and is designed particularly for installation in boats and other movable structures in which the employment of series of individual cells of large capacity is desirable to insure economy of space and a minimum number of connections between the cells.

The invention has for its object to provide a battery-cell for such purpose the walls of which shall have the requisite stiffness to resist the tendency to bulge outwardly into contact with those of the adjacent cell or cells when filled with the electrolyte to insure against leakage of electrolyte from any cause, and thus avoid liability to short-circuiting by such means, to afford thorough insulation between the elements of the adjacent battery-cells, to provide a means of maintaining in fixed relation the several cells of a battery system while permitting their ready removal individually, and to otherwise improve the features and method of construction of battery-cells for the purpose described. In the improved battery installation forming the subject of the patent granted to me November 4, 1902, No. 712,814, certain of these objects were in large measure attained; but the walls of the cells were supported laterally by an intervening bed of cement in which they were permanently embedded.

By the present improvement each cell is rendered self-contained, and therefore by suitable reinforcement of its inner acid-proof tank or receptacle independently of the adjacent cell or cells and any intervening filling, and is proof against the leakage of electrolyte through its walls, as well as against the slopping over of its contents through the pitching or careening of the vessel in which the system may be installed.

The present improvement also provides a suitable anchorage for the individual cells, from which each is readily removable when required and which provides for the effective drainage of the system.

The particular constructive features hereinafter described insure the increased efficiency of the battery system, while the method of construction which I have devised makes it practicable to manufacture uniformly and substantially such battery-cells to secure effective operation when in use.

Figure 2:
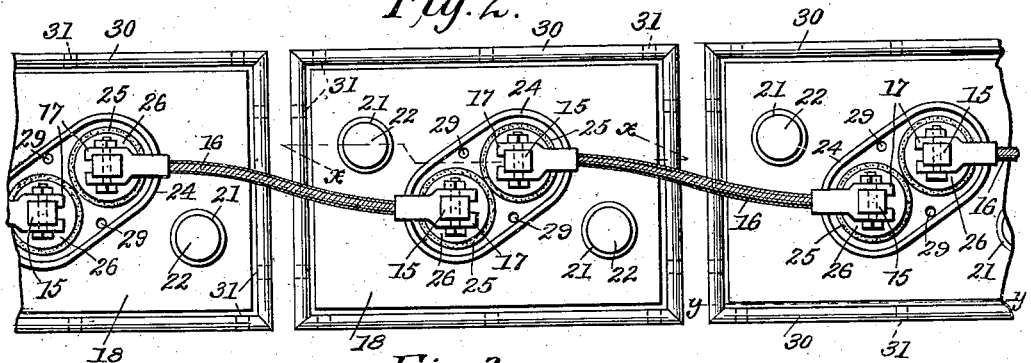
Figure 3:
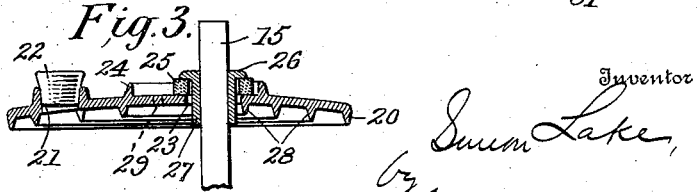

In the annexed drawings, Figure 1 is an elevation, partly in section, of a series of battery-cells embodying my present improvement, representing two slightly-different forms of cell, the central and right-hand cells being in section, respectively, on the lines $x\,x$ and $y\,y$ of Fig. 2, which is a plan of said series of cells. Fig. 3 is a sectional view of the cover of the inner tank or receptacle upon a larger scale, and Fig. 4 is a sectional elevational view illustrating the method of construction employed in the manufacture of battery-cells embodying the simpler form of the improvement.

The embodiment of the present improvement which I consider the preferable one is that of the cells represented at the center and right of Figs. 1 and 2, which are shown constructed each with an outer tank 1, preferably of corrugated sheet metal capable of resisting the action of acid, to the bottom of which is applied a thin layer 2 of some suitable non-absorbent and non-conducting waterproof substance, such as asphaltum cement. Upon this layer of cement is placed a rigid perforated plate or slab 3 of a preferably non-conducting stiffening material, such as wood or vulcanized fiber, which is covered with a second layer 5 of waterproof cement united around the edges and through the holes 4 of the stiffening-plate 3 with the cement layer 2.

The inner tank 6 rests upon the layer 5 of cement and is surrounded with a series of spaced stiffening-box sections 7 of a material similar to that of the stiffening-plate 3 and similarly provided with transverse holes 8. As represented herein, these box-sections are formed with interlocking corners; but they may be of other construction, if desired. The rigid perforated box-sections 7 are shown embedded in a non-absorbent and non-conducting waterproof filling 9, preferably consisting of asphaltum cement similar to that in which the bottom section or plate 3 is embedded, the layers of such cement separated by the walls of said box-sections being united above and below and through the holes 8 in the same by portions of cement entering the connecting-spaces thus formed.

The inner tank 6 contains the usual lead supports 10, upon which rest the glass supporting plates 11, whose upper edges sustain the battery-plates 12 by means of their notched lateral lugs 13, the plates 12 of like polarity being electrically connected together by means of the usual bus-bars 14, each of which is shown herein provided with an upwardly-projecting connection-lug 15, and from a socket-piece 17 secured thereon is led a cable 16 to a like socket-piece of an adjacent cell.

As above described, the composite walls of each cell are sufficiently rigid to hold the electrolyte in which the plates 12 are immersed without any tendency to bulging, even in case the cement filling should be softened by heating of the liquid contents, due to the short-circuiting of adjacent plates 12 or to other causes, the stiffening members 3 7 being infusible, and thus substantially unaffected by any moderate rise of temperature to which the contents of the cell are liable. Furthermore, the inner and outer tanks 1 and 6 are rendered entirely separate and independent by means of the effective insulation afforded by the interposed composite filling, so that even when the cells of a series are set in contact there can be no danger of leakage between adjacent cells.

In practice I employ a cement filling composed of a mixture of asphaltum, pumice, and a heavy oil to give the qualities which I consider desirable for the purpose, the ingredients being so proportioned that the mixture remains hard at temperatures below that of boiling water; but owing to its non-absorbent character when softened, as before described, any of the electrolyte which leaks through cracks or seams in the inner tank 6 is not allowed to work its way transversely through the filling by absorption or otherwise to the outer tank 1, for, being of less specific gravity than the softened cement, it is necessarily forced to the top along the hotter surface of the inner tank, the aperture through which it escaped being quickly sealed by the cement displacing it, whereby further leakage is prevented. In introducing this composite filling it is desirable that the wooden plates or slabs 3 and 7, constituting an insulating and spacing material infusible at moderate temperatures, should be disposed intermediate and out of contact with the outer and inner members of the laminated walls of the cell in order that layers or slabs of the waterproof insulating material, which is readily fusible at moderate temperatures, as described, may be run in between such wooden plates and the adjacent faces of the inner and outer members for the reasons just mentioned, while the whole structure is adapted to be bound together by reason of the perforate and sectional character of the said insulating and spacing member through the interstices presented, whereby connecting tie members joining and integral with the fusible plates or slabs are provided.

To prevent the overflow of the electrolyte from the cell by reason of the pitching or careening of the vessel in which it is installed, a cover 18 is applied to the top of the inner tank above the bus-bars 14. As will be seen by reference to the drawings, the space between the walls of the inner and outer tanks is filled with the asphaltum cement 9 nearly to the top of the tank 6, the remainder of such space containing a species of cement 19 of comparatively low fusibility, such as paraffin. The joint of the cover 18 with the body of the cell is thus effectively sealed by merely heating up such cover preparatory to its application, when the insertion of its edges or the depending ribs 20 thereon in the paraffin filling operates to sufficiently soften the latter to enable it to embed itself therein, so that the subsequent cooling of both causes the paraffin to firmly adhere to the marginal rib and form therewith an air and liquid tight joint through which the battery-fumes and electrolyte cannot penetrate.

The cover 18 is shown formed intermediate its edges with a pair of inspection-apertures 21, maintained normally closed by means of the removable plugs 22, and with a pair of apertures 23 for the passage of the connection-lugs 15, encircled upon the upper face of the cover by a curb 24 and surrounded each by a preferably porous packing-ring 25, upon which rests the lateral flange 26 of an insulating sleeve or thimble 27, losely fitted to its respective connection-lug.

The insulating-sleeves 27 insure against the grounding of the bus-bar lugs 15 upon the cover 18, which is preferably of metal, and the porous packing-rings 25 serve to filter from the gases set free in the latter part of the process of charging the battery any particles of electrolyte which may remain in suspension therein after passage beneath and impingement upon the series of concentric depending ribs 28 on the under side of the cover 18, which latter are provided to catch such particles and accumulate them into drops which may drip down into the tank 6. In case the packing 25 should become saturated at any time and the liquid pass beyond the same, it would be caught by the curb 24 and would gradually find its way back through the porous packings as soon as the battery action ceased to enable the packings to drain into the tank 6, so that none of the fluid would overflow, or instead such fluid could readily run back into the cell through drip-holes 29, which may be provided for the purpose.

The battery elements may be readily inspected by an attendant by temporarily removing the plugs 22.

To provide a convenient means of handling the battery-cells, which are too large when constructed for the uses for which they are intended to lift by hand, the outer cell 1 is provided at the top with a strengthening-band 30 of iron or steel, which is preferably enveloped in a suitable pocket formed therefor around the extreme upper edge of the tank, of the preferably acid-proof material of which the latter is composed, and the outer tank being made slightly higher than the inner tank for the purpose several lateral holes 41 are formed through this band and its covering just above the top of the cover 18, into which holes may be inserted the terminal hooks of a hoisting-chain or other device for lifting the cell. The holes 31 serve also to carry off any water which may be shipped by the vessel containing the batteries, so as to prevent its introduction to the interior of the cell and consequent injury of the contents.

While the corrugated form illustrated at the center and right in Fig. 1 is considered preferable for the outer tank 1 in order to give increased strength and stiffness to such receptacle, it is evident that such tank may be made with flat walls, as indicated at the left of said figure, without materially impairing the effectiveness of the construction.

I consider the wooden bottom and lateral box-sections 3 and 7 desirable, because of the non-conducting qualities of such material, which would maintain the inner and outer tanks effectively spaced apart and fully insulated one from the other even in case the battery elements should become so heated as to entirely liquefy the intermediate cement filling in any portion; but such wooden sections may be replaced by the corrugated sheet-metal sections 32, as indicated also at the left in Fig. 1, if greater stiffness be desired, without the non-conductive quality referred, to, or additional sheets of suitable non-conducting material may also be interposed between such metallic box-sections and the tanks 1 and 6, if desired. In constructing either these box-sections or the outer tank 1 from corrugated sheet metal the corrugations of the blank from which they are formed are obviously interrupted in the portions which are to form the corners to permit them to be easily bent at a right angle without distortion, as indicated in the representation of the lower box-section at the left in Fig. 1.

As already stated, the component battery-cells of a series constructed as above described may be safely placed in contact one with another without the liability of short-circuiting by reason of such contact; but I prefer by way of precaution to space them at short distances apart, with their lower portions set in a bed 33 of some readily-fusible non-conducting waterproof cement, as paraffin, to insure their remaining in fixed relation under all movements of the structure containing them, and thus thoroughly insulated and provided with suitable intermediate drainage-channels for conducting off any liquid that may be introduced either from the interior or exterior of any of the cells.

In order to prevent the shifting of the battery-plates edgewise in their respective cells, each cell is shown provided intermediate the opposite inner walls and the lateral lugs 13 of the plates 12 with the non-conducting spacing-plates 34.

The method of procedure employed in constructing the battery-cells as above described is as follows, reference being had more particularly to Fig. 4: To the exterior of the outer tank or receptacle 1 is closely fitted the rigid form A, constructed with sufficiently heavy walls to resist any tendency to bulge under the outward pressure to which the contained tank 1 is to be subjected. The inner surfaces of the tank 1 are then preferably provided with a thin coating of the asphaltum cement, after which a thin additional layer 2 of this cement is introduced in the bottom, upon which is placed the perforated stiffening board or slab 3, through the perforations 4 of which a portion of the superposed layer 5 next introduced penetrates while still in a liquid or plastic condition. Upon this cement layer 5 is now placed the inner tank 6, which is similar in shape to the outer tank 1, but of such reduced dimensions as to provide an intermediate space around the side walls for the non-conducting filling. The inner form B, closely fitted to the inner walls of the tank 6, is now introduced to support such walls from collapse while the intermediate filling is being inserted. With a ladle C or other suitable receptacle filled with melted asphaltum cement, such as that already described, a small additional portion is poured into the space intermediate the inner and outer tanks, in which is embedded a wooden box-section 7, upon and around which is poured another charge of cement from the ladle C sufficient to cover the upper edge of the box-section previously introduced, which unites with the adjacent lower layer and fills the transverse holes 8 in the walls of the box-section through which the two vertical layers inclosing such box-section are united and firmly bound together, as well as cemented to the coatings of the adjacent walls of the tanks 1 and 6 previously applied, which are sufficiently softened for the purpose by contact of such newly-poured charge. The next box-section 7 is now superposed with its lower edge embedded in th last-poured cement, but slightly separated from the top of the lower section, and another charge of liquid cement added to fill the vacant space intermediate the same and the tanks 1 and 6, and these operations are continued until the composite filling thus formed reaches a level a little below the upper edge of the inner tank 6, the remaining space being thereafter filled in a similar manner with the melted paraffin 19 or some other readily-fusible non-conducting waterproof substance. When the cement portion of the composite filling separating the inner from the outer tank has sufficiently set, the forms A and B are removed and the battery elements introduced, after which the cover 18, having been previously heated to the required temperature, is placed over the tank 6, with its marginal flanges or ribs 20 resting upon the paraffin filling, in which they sink as the paraffin partially melts. As the cover 18 cools the paraffin again solidifies and, clinging to the surface of the ribs 20, forms a sealed joint therewith which is gas and liquid tight.

From the foregoing description it will be evident that the present improvement is not limited to the specific features of construction of battery-cells herein shown and described, but that the various constructive details may be varied materially without departure from the spirit of the invention.

Having thus set forth the nature of the invention, what I claim herein is—

1. A battery-cell comprising an inner tank and an outer tank inclosing the same, rigid plates of material infusible at moderate temperatures interposed between and spaced from the walls of said tanks, and a filling of readily-fusible waterproof insulating material also interposed between the walls of said tanks and occupying the spaces intermediate said plates and the walls of said tanks.

2. A battery-cell formed with laminated walls composed of different materials comprising inner and outer metallic tanks providing inner and outer metallic plates of the laminated wall, rigid plates or slabs of readily-fusible non-conducting cement applied to the adjacent faces of said inner and outer plates, and interposed perforate insulating-plates of material infusible at moderate temperatures disposed in contact with and having extended through their perforations tie members connecting said plates or slabs of cement.

3. A battery-cell comprising an inner tank and an outer corrugated sheet-metal tank inclosing the same, an intermediate spacing member formed of non-conducting material, and a filling of non-conducting cement in which said intermediate spacing member is embedded.

4. A battery-cell comprising an inner tank and an outer tank inclosing the same with an intervening space, a filling of insulating material fusible at moderate temperatures within said intervening space, and a cover for said inner tank formed of a material infusible at moderate temperatures and having its edges embedded in said filling which adheres thereto in forming a hermetically-sealed joint by the heating of the cover to enable the latter to soften the contiguous portions only of the filling into which it sinks.

5. A battery-cell comprising an inner tank, an outer tank inclosing the same, a filling intermediate said tanks composed of materials of different degrees of fusibility, that of greater fusibility being superposed upon that of less fusibility, and a cover for said inner tank with edges embedded in the portion of the filling having the greater fusibility.

6. A battery-cell comprising an inner tank, an outer tank inclosing the same, a normally hard fusible cement filling intermediate said tanks, and a cover for said inner tank having a depending flange around its edges embedded in said cement filling.

7. A battery-cell comprising a tank, a cover therefor having at its edges a sealed joint therewith and provided intermediate the edges with an aperture or apertures, series of battery-plates and connecting bus-bars within said tank and beneath said cover, a connection-lug extending upwardly from each bus-bar through an opening in said cover, a packing surrounding said opening in the cover, and a sleeve closely embracing said connection-lug and seated upon said packing.

8. A battery-cell comprising a tank, a cover therefor having at its edges a sealed joint therewith and provided intermediate the edges with an aperture or apertures, a series of battery-plates and connecting bus-bars within said tank and beneath said cover, a connection-lug extending upwardly from each bus-bar through an aperture in said cover, a porous packing surrounding said aperture in the cover, and a sleeve closely embracing said connection-lug and seated upon said packing.

9. A battery-cell comprising a tank, a cover therefor having at its edges a sealed joint therewith and provided intermediate the edges with an aperture or apertures, series of battery-plates and connecting bus-bars within said tank and beneath said cover, a connection-lug extending upwardly from each bus-bar through an aperture in said cover, a packing surrounding said aperture in the cover, a sleeve closely embracing said connection-lug and seated upon said packing, and a curb formed upon said cover around its said aperture or apertures to retain any fluid escaping through such aperture.

10. A battery-cell comprising an inner acid-proof tank, an outer tank of greater height inclosing the same, an intermediate non-conducting filling, a sealed cover for closing said inner tank, and a strengthening-band encircling the top of said outer tank and provided with lateral holes arranged above said cover.

11. A storage-battery system consisting of a series of storage-battery cells each comprising an inner tank, an outer tank inclosing the same, interposed plates of stiffening material between said tanks, and a non-conducting filling in which said plates are embedded, said battery-cells having their extreme lower portions embedded in waterproof non-conducting cement with intermediate air-spaces between their upper portions.

In testimony whereof I have signed my name to this specification in the presence of two subscribing witnesses.

SIMON LAKE.

Witnesses:
FRED B. WHITNEY,
HENRY J. MILLER.